United States Patent [19]

Hauser

[11] 4,405,039

[45] Sep. 20, 1983

[54] FLUID FRICTION CLUTCH

[75] Inventor: Kurt Hauser, Stuttgart, Fed. Rep. of Germany

[73] Assignee: Sueddeutsche Kuehlerfabrik Julius Fr. Behr GmbH & Co., KG, Stuttgart, Fed. Rep. of Germany

[21] Appl. No.: 290,058

[22] Filed: Aug. 4, 1981

[30] Foreign Application Priority Data

Aug. 8, 1980 [DE] Fed. Rep. of Germany ....... 3029992

[51] Int. Cl.³ .................. F16D 35/00; F16D 43/25
[52] U.S. Cl. ............................. 192/58 B; 192/82 T
[58] Field of Search ................. 192/58 A, 58 B, 82 T

[56] References Cited

U.S. PATENT DOCUMENTS

| 3,257,808 | 6/1966 | Kuiper | 192/58 A |
| 3,259,220 | 7/1966 | Roper | 192/58 B |
| 4,310,084 | 1/1982 | Nonnenmann | 192/58 B |

FOREIGN PATENT DOCUMENTS

| 1286350 | 1/1969 | Fed. Rep. of Germany . |
| 1284186 | 7/1969 | Fed. Rep. of Germany . |
| 1961107 | 6/1971 | Fed. Rep. of Germany . |
| 2364234 | 7/1975 | Fed. Rep. of Germany .... 192/58 B |
| 2804859 | 8/1979 | Fed. Rep. of Germany .... 192/82 T |
| 849933 | 5/1957 | United Kingdom ............. 192/58 B |

Primary Examiner—Rodney H. Bonck
Assistant Examiner—David D. House
Attorney, Agent, or Firm—Schwartz, Jeffery, Schwaab, Mack, Blumenthal & Koch

[57] ABSTRACT

Disclosed is a fluid friction clutch, preferably for driving the fan in an automotive cooling system, comprising a driven disk member; a drivable housing member surrounding the driven disk member in such a manner as to provide a working chamber therebetween for receiving a fluid capable of transmitting rotational force between the driven disk member and the housing member; a reservoir separate from the working chamber for containing the fluid; a selectively openable and closable inlet orifice providing fluid communication between the reservoir and the working chamber; a return conduit providing fluid communication between the working chamber and the reservoir; and a supplemental disk member rotatable with the driven disk member and positioned within the reservoir so as to be wetted by the fluid at least when the fluid friction clutch is at rest.

11 Claims, 4 Drawing Figures

FLUID FRICTION CLUTCH

BACKGROUND OF THE INVENTION

The present invention relates to a fluid friction clutch, and more especially to a fluid friction clutch for driving a fan in a liquid-cooled internal combustion engine wherein a viscous fluid is circulated between a reservoir and a working chamber to transmit torque between a drive disk and the clutch housing.

Clutches of this type are known, for example, from German Pat. Nos. 12 84 186 and 12 86 350 and are used preferably as cooling fan transmissions to control the temperature of the circulating cooling media in an automotive internal combustion engine. When the clutch is disengaged, all of the viscous fluid is in the reservoir, and the housing of the clutch with the fan attached thereto is entrained only as the result of bearing friction between the clutch housing and the drive shaft and friction produced by air located in the working gaps between the clutch housing and the drive disk. In the process, especially when ball bearings are used a relatively low rpm of the clutch is established, which in the case of high capacity truck cooling fans may drop to very low values, for example, 300 rpm, because of the high counter momentum. With rising temperatures of the cooling medium, the valve to the working chamber is opened by means of a suitable, thermostatically actuated servo mechanism, and the viscous fluid is forced into the working chamber as a result of the pressure prevailing in the reservoir. This pressure is a function of the output velocity of the clutch. Simultaneously, the fluid entering the working chamber is moved back into the reservoir via a baffle, so that a circulation of the fluid is obtained. The volume of the viscous fluid pumped from the working chamber is a function of the relative rpm or relative circumferential velocity between the drive disk and the clutch housing, i.e., the driving and driven rpm of the clutch.

It follows from these relationships that, in the case of a low output velocity of the clutch, the flow of the fluid into the working chamber is poor or delayed and that, while at the same time, with a correspondingly high relative velocity between the driving and driven sides of the clutch, there is a relatively rapid movement of the fluid from the working chamber. Both of these phenomena are disadvantageous, especially in the case of high viscosities of the viscous fluid, for example, in excess of 0.015 gm/sec, or 15,000 centistokes, because they may result in a delayed actuation of the clutch (starting of the fan) and thus in the overheating of the internal combustion engine. A lag in this actuation is particularly critical during the cold starting of the internal combustion engine, in view of the rapid rise in the engine output. The cold fluid is highly viscous and therefore passes through the valve orifice only with difficulty. With a fan having a large diameter and a high driving torque, lags in actuation of several minutes may occur, so that the cooling of the internal combustion engine during the rapid rise in load is no longer assured. For low output velocities of the clutch, i.e., low rpm of the fan, this results, as mentioned hereinabove, in decisive disadvantages concerning the actuation behavior of a fluid friction clutch of this type. On the other side, low output velocities are wanted, because they favor the warm up of the engine, save fuel and reduce the fan noise.

SUMMARY OF THE INVENTION

It is therefore an object of the present invention to provide an improved fluid friction clutch.

Another object of the invention resides in the provision of a fluid friction clutch with improved control of the behavior so that the output velocity of the clutch will rise as uniformly as possible, i.e., approximately in proportion to the rise in temperature of the cooling medium to be controlled.

Specifically, it is an object of the invention to improve the flow conditions of the viscous fluid into the working chamber and the conditions of its return flow from the working chamber during low output velocities of the clutch, in view of an improved actuating behavior of the clutch.

Still another object is to provide an improved cooling system for an automotive vehicle employing the fluid friction clutch according to the invention.

In accomplishing the foregoing objects, there has been provided in accordance with the present invention a fluid friction clutch, comprising a driven disk member; a drivable housing member surrounding the drive disk member in such a manner as to provide a working chamber therebetween for receiving a fluid capable of transmitting rotational force between the driven disk member and the housing member; a reservoir separate from the working chamber for containing the fluid; a selectively openable and closable inlet orifice providing fluid communication between the reservoir and the working chamber; a return conduit providing fluid communication between the working chamber and the reservoir; and a supplemental disk member rotatable with the driven disk member and positioned within the reservoir so as to be wetted by the fluid at least when the fluid friction clutch is at rest.

Further objects, features and advantages of the present invention will become apparent from the detailed description of preferred embodiments which follows, when considered together with the attached figures of drawing.

DETAILED DESCRIPTION OF PREFERRED EMBODIMENTS

Figure 1:
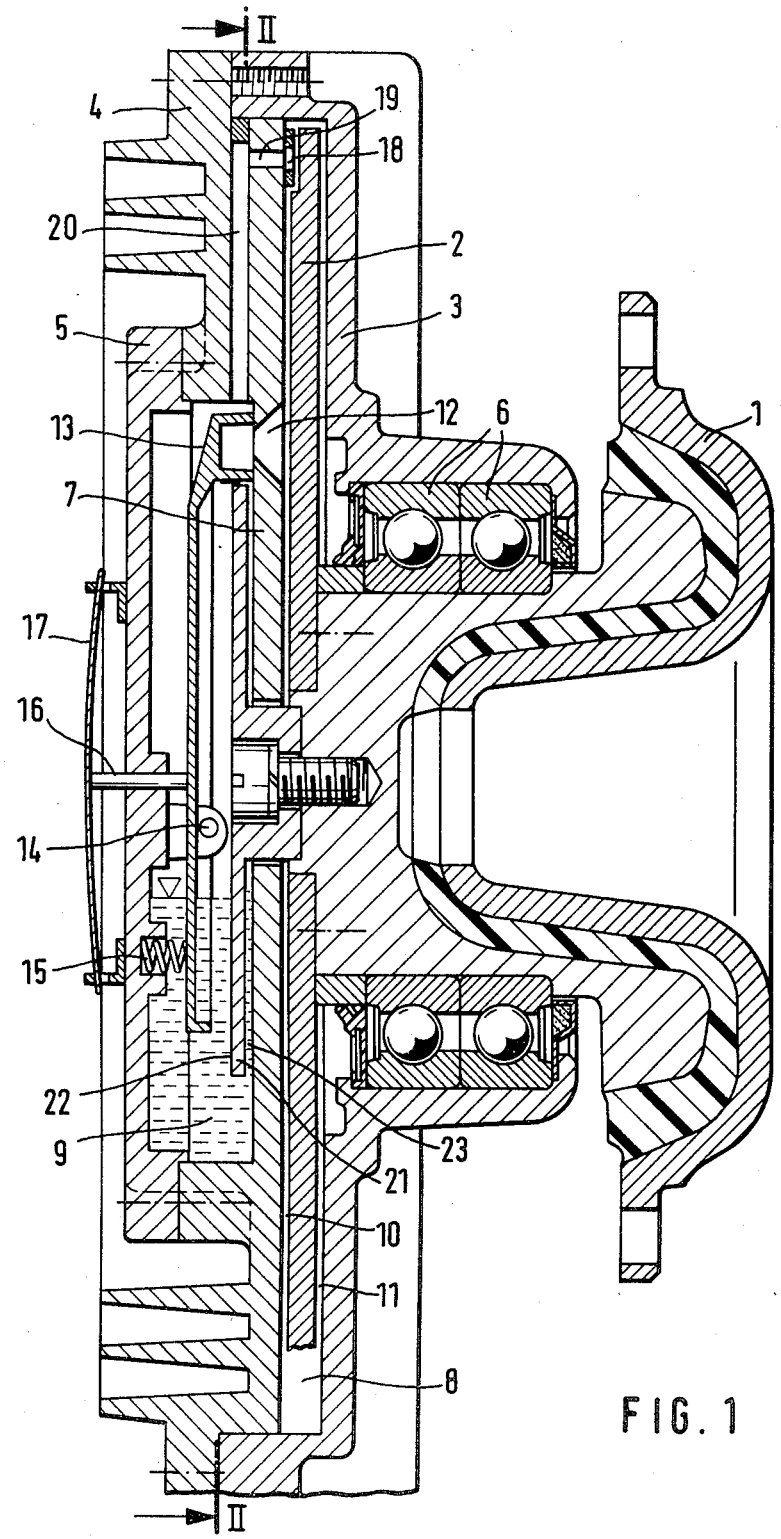
FIG. 1 is a cross-sectional view of a clutch with a supplemental disk.

The supplemental disk provided in accordance with the present invention which is fixedly connected with the drive shaft results in the following advantages:

Initially, the fluid pressure of the viscous fluid in the reservoir is no longer dependent solely on the output velocity of the clutch, but also on the driving rpm of the clutch through the supplemental disk. This leads, in spite of low output velocities of the clutch, to higher fluid pressures, so that the conditions of the flow through the orifice of the valve into the working chamber are improved in the sense that the working chamber is being filled in a more uniform manner. This in turn leads to a gradual increase in the output rpm of the clutch, i.e., to a rise in the output velocity which is approximately proportional to the rise in temperature of the cooling medium. A delay in the actuation of the clutch is thereby effectively prevented. Furthermore, by means of the supplemental disk designed in keeping with the invention, the fluid in the reservoir is heated by the friction between the supplemental disk and the fluid, thereby reducing its viscosity. This in turn leads to improved flow conditions for the fluid and to an improved actuating behavior as the result of the better filling of the working chamber.

According to a preferred embodiment of the invention, the inlet orifice to the working chamber is located in the region of the external diameter D or circumferential periphery of the supplemental disk. This coordination of the supplemental disk and the inlet orifice of the valve results in a good transport effect of the supplemental disk and thus in an improved inflow behavior of the viscous fluid.

According to a further advantageous embodiment of the invention, an additional gap for the transfer of torque between the supplemental disk and the clutch housing is provided. By means of this additional gap, on the one hand, the viscous fluid in the reservoir is heated more rapidly as a result of the retained heat and thus its viscosity is reduced, and on the other hand, the so-called idle rpm of the clutch, i.e., its minimum output velocity, is increased because of the additionally transmitted torque. The higher rpm in turn again lead to improved inflow properties of the viscous fluid.

According to a further advantageous embodiment of the invention, passage orifices are provided in the supplemental disk, thereby making possible the flow of the viscous fluid from the forward side of the supplemental disk into the additional gap, thereby increasing the effectiveness of the additional gap, i.e., the transferability of the additional torque.

According to a further advantageous embodiment of the invention, grooves or blades are provided on the supplemental disk to cause efficient transport of the fluid in the lower range of output velocity, thereby again improving the inflow conditions of the viscous fluid.

According to another advantageous development of the invention, a baffle is provided in the area of the inlet orifice, to produce an acceleration of the fluid moved outwardly by the supplemental disk into the working chamber. This leads to a more rapid and uniform filling of the working chamber and thus to an improved control behavior of the clutch.

In still another advantageous embodiment of the invention, an additional baffle is provided in the vicinity of the return conduit in the reservoir. This additional baffle causes a delay in the return flow of the fluid from the working chamber. This takes place because the fluid returning through the return conduit is met by a counter flow moved by the supplemental disk as a result of the baffle, resulting in a delay of the return flow of the fluid and thus in a slower emptying of the working chamber. The delayed emptying of the working chamber in turn effects a more uniform filling thereof and thus an improved actuating behavior of the clutch.

By means of a further advantageous embodiment of the invention, a trap pocket is provided on the baffle in the vicinity of the return bore, thereby further increasing the baffle or delaying effect.

Still another advantageous embodiment of the invention provides an additional bore between the reservoir and the working chamber, resulting in an additional flow of the viscous fluid, in the case of a closed valve, from the reservoir into the working chamber. This increases the idle rpm and improves the actuating behavior of the clutch.

Through a further embodiment of the invention, the effect of an additional flow of the fluid may be enhanced by the placing of a baffle or a trap pocket, respectively, in the vicinity of the additional bore.

All of the measures according to the invention result in a strengthening of the fluid flow in the lower range of the output velocity of the clutch, i.e., of the rpm of the fan, and simultaneously a braking of the return flow of the fluid, while the effect practically disappears in the upper range of the rpm of the fan, i.e., this yields a more uniform filling of the working chamber in the intermediate rpm range also, so that stable intermediate rpm operations are additionally attained. By means of the gradual rise in the output velocity of the clutch from idle running to the fully actuated rpm, delays in the actuation are eliminated and internal combustion engines equipped with a fluid friction clutch according to the invention are secured against overheating. It is also further possible, as the result of the measures according to the invention, to operate clutches of this type with a fluid of higher viscosity then heretofore, leading to the transfer of a higher torque.

Exemplary preferred embodiments of the invention are illustrated in the drawings and shall be described in more detail hereinafter with reference to the drawings.

FIG. 1 illustrates a fluid friction clutch of the type used preferentially for driving a fan for a liquid cooled internal combustion engine. Herein, the drive shaft 1 of the clutch is powered by the internal combustion engine or by one of its accessories. The drive disk 2 is fixedly connected for rotation with the drive shaft 1, the drive disk being located between the clutch housing 3 and the combination of a clutch cover 4 and a partition 7 connected with the clutch cover. On the external circumference of the clutch housing 3, a fan (not shown) may be mounted to produce a cooling flow of air for a water-containing radiator of an internal combustion engine. The central area of clutch cover 4 is enclosed by an inner cover 5 and forms a unit fixedly joined for rotation with the clutch housing 3. This unit is rotatingly mounted on the drive shaft 1 by means of a pair of ball bearings 6. In the conventional manner, working gaps 10 and 11 are located between the drive disk 2 on the one side, and the partition 7 and the clutch housing 3, on the other. Together, the working gaps form the working chamber 8 of the clutch.

Separately from the working chamber 8, a reservoir 9 is provided, which is connected with the working chamber 8 by the inlet orifice 12 and the return orifice 19 together with the return conduit 20. A viscous fluid, not numbered, is in the reservoir 9. Its fill level is indicated for a standing clutch in FIG. 1. The control of the inflow from the reservoir 9 into the working chamber 8 is effected by means of a valve lever 13, which opens and closes the inlet orifice 12 and is moved by means of a control pin 16, which is actuated by a bimetal element 17. Valve lever 13 is rotated around the bearing 14 on the inner cover 5, with the compression spring 15 acting in the direction of lifting the valve lever 13 from the inlet orifice 12.

The return flow of the viscous fluid from the working chamber 8 into the reservoir 9 is effected by means of a baffle 18 arranged in the radially outward area of the drive disc 2. The baffle moves the fluid transported by the drive disk 2 through the return orifice 19 and the return conduit 20 into the reservoir 9. When the inlet orifice 12 is open, as a result of lifting of the valve lever 13, there is a constant circulation of the viscous fluid between the working chamber 8, with its associated work gaps 10 and 11, and the reservoir 9.

The fluid friction clutch described up until this point is known with respect to its layout and mode of operation. According to the present invention, a supplemental disk 21 is arranged in the fluid reservoir 9. The disk 21 penetrates through the partition 7 and is fixedly joined for rotation with the drive shaft 1. In the preferred embodiment shown in FIG. 1, an additional gap 23 is located between the rear side of the supplemental disk 21 and the forward side of the partition 7, this gap being dimensioned with respect to its width so that the filling of the gap with viscous fluid effects the transmission of an additional torque between the supplemental disk 21 and the partition 7 and the housing 3, respectively. for the transfer of such a torque by means of the shear forces of a viscous fluid, known silicone oils are used, e.g., silicone oils having viscosities in the range of approximately 6,000 to 60,000 centistokes.

The function of the supplemental disk according to the invention, in combination with the fluid friction clutch, shall be described hereinafter.

As indicated in FIG. 1, viscous fluid is present in the reservoir 9 to the level shown with the clutch at rest, so that the supplemental disk 21 is immersed in the fluid and thus wetted by it. The rotating drive shaft 1 entrains the supplemental disk 21 and thus the fluid wetting it, which is urged in the outward direction by the centrifugal effect. Simultaneously, an additional torque is transmitted to the clutch housing 3 as the result of the fact that the additional gap 23 is filled with viscous fluid, so that the housing 3 is also entrained by the drive shaft 1, even though with considerable slipping. At the same time, the viscous fluid in the reservoir 9 is being heated by the friction due to the slipping and thereby loses some of its viscosity. As a result of the reduced viscosity of the fluid, its flow properties are improved so that it arrives more rapidly and uniformly in the working gaps 10 and 11 of the clutch. This assures uniform start-up of the clutch.

Figure 2:
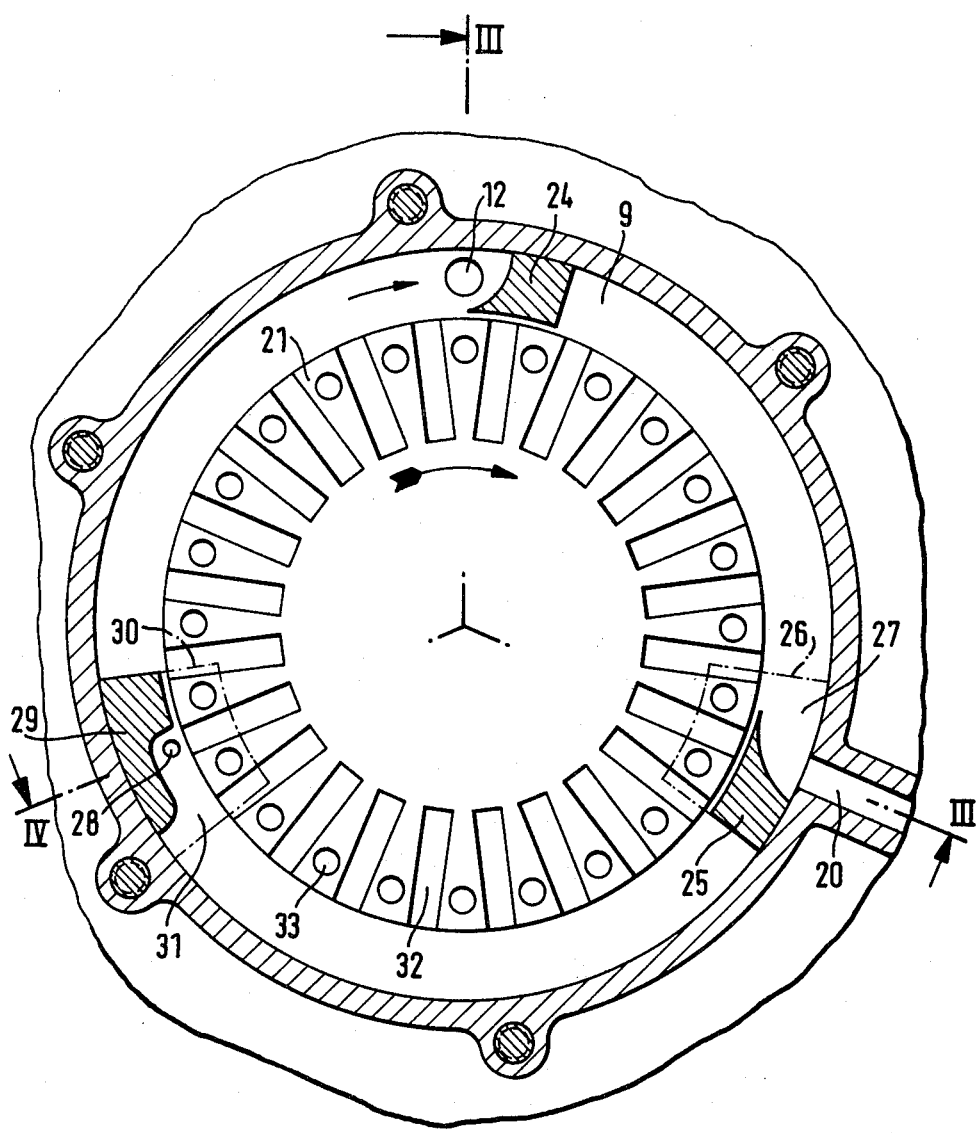
FIG. 2 is a partial radial section taken along the line II—II in FIG. 1 of a clutch with the supplemental disk.
Figure 3:
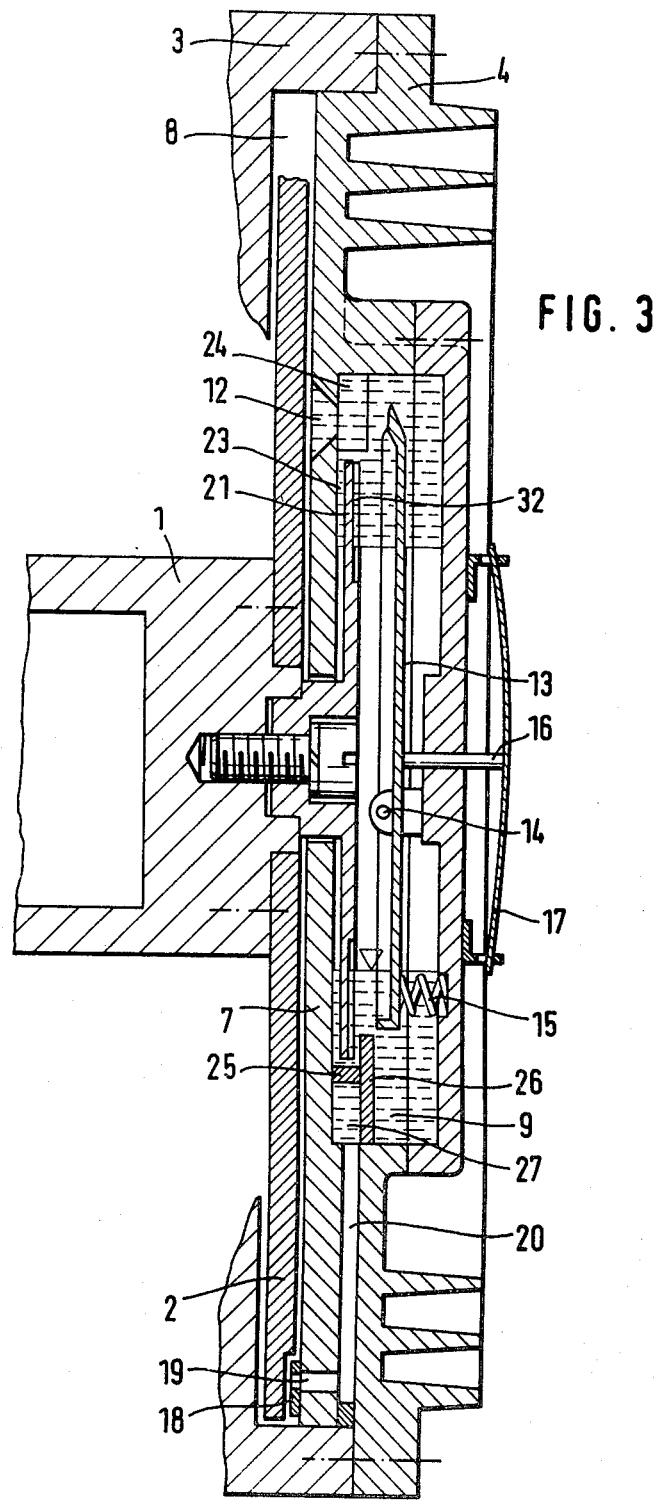
FIG. 3 is an axial section taken along the line III—III in FIG. 2 of a clutch with the supplemental disk and baffles.
Figure 4:
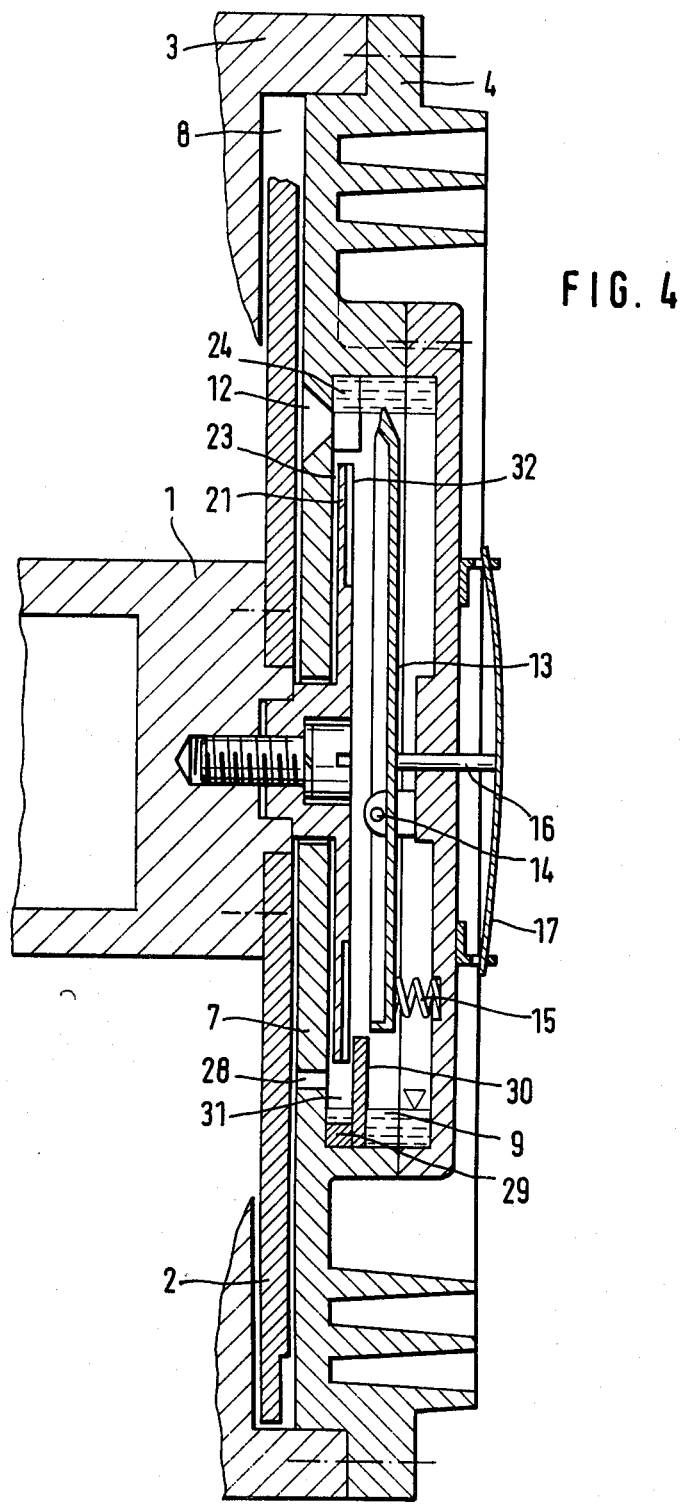
FIG. 4 is an axial section taken along the line III–IV in FIG. 2 of a clutch with the supplemental disk and baffles.

FIGS. 2, 3 and 4 show advantageous further developments of the invention, wherein identical reference numbers are used for identical parts of the clutch. FIG. 2 shows a radial section of the clutch along the line II—II in FIG. 1, wherein, however, in FIG. 1 the return conduit 20 has been placed in the plane of the drawing for the sake of improved representation. This is not true for the actual clutch, as seen in FIG. 2. To improve the inflow of viscous fluid from the reservoir 9 into the working chamber 8, a baffle 24 is provided behind the inlet orifice 12 in the direction of rotation, indicated in FIG. 2 by arrows in the clockwise direction, said baffle being visible in its axial dimension in FIG. 3. The viscous fluid transported by the supplemental disk 21 builds up in front of the baffle 24 and thus flows more rapidly through the inlet orifice 12 into the working chamber 8.

For the further improvement of the control behavior of the clutch, another baffle 25 (seen in FIGS. 2 and 3) is provided in the reservoir 9 in the vicinity of the outlet of the return conduit 20. This baffle 25 also effects a buildup of viscous fluid, because of the rotation of the supplemental disk 21, and this buildup acts against the return flow of the viscous fluid through the return conduit 20 from the working chamber 8. This measure acts to delay the rapid return flow of the fluid from the working chamber 8, so that, in the case of a low output velocity of the clutch, i.e., a high difference in rpm between the driving and driven sides of the clutch, the working chamber 8 remains adequately filled with fluid and is thus able to transmit a torque, thereby enabling the clutch to start up uniformly. In order to enhance the buildup effect in front of the baffle 25, the latter may be encompassed laterally by a plate member 26 which extends radially inwardly over a portion of the supplemental disk 21 to form a trap pocket 27.

To further improve the inflow behavior of the viscous fluid from the reservoir 9 to the working chamber 8, an additional bore 28 (FIGS. 2 and 4) is provided in the partition 7. This bore 28 yields, in cooperation with a baffle 29 arranged in its vicinity, a supplemental flow of the fluid into the working chamber 8, even when the inlet orifice 12 is closed. To increase the buildup effect of the baffle 29 in front of the additional bore 28, this baffle may also be provided with a plate member 30 extending over the supplemental disk 21 at least to a certain extent in the radially inward direction, so that in the vicinity of the additional bore 28, a trap pocket 31 is created for the fluid transported by the supplemental disk 21.

To improve the transport action of the supplemental disk 21, the latter has grooves 32 extending essentially in the radial direction, these grooves being worked into one or both of the frontal sides of the supplemental disk 21. In FIGS. 2–4, the grooves are shown on the forward side of the supplemental disk only. In place of the grooves 32 shown in the drawing, protruding blades may also be arranged on the supplemental disk 21.

Finally, in the supplemental disk 21 (as seen in FIG. 2) passage orifices 33 are arranged, which make possible passage of the fluid from the forward side 22 of the supplemental disk 21 into the rearward additional gap 23. This assures the adequate filling of the additional gap 23 with viscous fluid.

To demonstrate the operational behavior of the clutch, the different fill states of the working chamber 8 and of the reservoir 9 are shown in FIGS. 1, 3 and 4. Thus, FIG. 1 shows the clutch at rest, wherein the level of the fluid is relatively high and the fluid fills almost entirely the lower half of the reservoir 9. The valve lever 13 closes the inlet orifice 12 in FIG. 1, and all of the fluid is being pumped from the working chamber 8 into the reservoir 9. When the engine is running, i.e., the drive shaft 1 is rotating, the clutch housing 3 is entrained as a result of the friction of the bearings 6 and the air friction in the working gaps 10 and 11. Additionally, a torque is transmitted by the additional gap 23 (i.e., between the supplemental disk 21 and the partition 7) from the drive shaft 1 to the clutch housing 3. The fluid present in the reservoir 9 is thereby distributed more rapidly over the circumference of the reservoir 9 in the form of a fluid ring, as seen in FIG. 3. In this state, the valve lever 13 closes the inlet orifice 12, and all of the fluid is in the reservoir 9, but in contrast to FIG. 1, in the form of a fluid ring stabilized by the centrifugal force. In this filling state, the clutch housing 3 and the fan attached to it run at the so-called idle rpm, wherein the radiator of the internal combustion engine does not yet require the flow of air provided by the fan. Only when the temperature of the cooling medium of the engine begins to rise and with it the cooling air coming from the radiator and impacting the bimetallic element 17, is the valve lever 13 lifted slowly from the inlet orifice 12, so that fluid may flow into the working chamber 8 as a result of the pressure prevailing in the reservoir 9. This fluid pressure is enhanced by the supplemental disk 21 provided according to the invention, and the supplemental disk 21 simultaneously reduces the viscosity of the fluid by means of the friction-generated heat. The result of both measures is an improved, i.e., more uniform, flow of the fluid into the working gaps 10 and 11 of the clutch. This insures the uniform start-up of the clutch, approximately proportional to the rise of temperature of the cooling medium of the engine and prevents the delayed actuation of the clutch. When the valve lever 13 completely opens the inlet orifice 12, i.e., during the maximum operation of the fan, the fill state of the clutch is as shown in FIG. 4.

Relatively little viscous fluid is then found in the reservoir 9, although it is again in the form of a fluid ring, while the overwhelming part of the fluid is in the working chamber 8 and the working gaps 10 and 11, while the fluid circulates in a known manner between the working chamber 8 and the reservoir 9. It is seen in FIG. 4 that, at this full load rpm of the fan, the supplemental disk 21 is no longer wetted by the fluid because its diameter is less than the diameter of reservoir 9, so that its effect is deactivated while the fan is operating within its full range of rpm. The supplemental disk thereby fulfills its function, in combination with the further embodiments in the form of baffles and additional bores, in the lower range of output velocities of the clutch and thus improves the control behavior of the clutch in this rpm range, while in the upper rpm range, the effect of the supplemental disk is neutralized.

What is claimed is:

1. A fluid friction clutch, comprising:
   a driven disk member;
   a drivable housing member surrounding said driven disk member in such a manner as to provide a working chamber therebetween for receiving a fluid capable of transmitting rotational force between said driven disk member and said housing member;
   a reservoir separate from said working chamber for containing the fluid;
   a selectively openable and closable inlet orifice providing fluid communication between said reservoir and said working chamber;
   a return conduit providing fluid communication between said working chamber and said reservoir; and
   a supplemental disk member rotatable with said driven disk member and positioned within said reservoir so as to be wetted by the fluid at least when the fluid friction clutch is at rest.

2. A fluid friction clutch according to claim 1, wherein said inlet orifice is arranged in the region of the circumferential periphery of said supplemental disk member.

3. A fluid friction clutch according to claim 1 or 2, wherein said supplemental disk is positioned sufficiently close to said housing member to form an additional gap for the transmission of torque via the fluid.

4. A fluid friction clutch according to claim 3, wherein said supplemental disk comprises a plurality of fluid passage orifices therethrough.

5. A fluid friction clutch according to claim 3, wherein said supplemental disk comprises on at least one side thereof a plurality of grooves or blades extending substantially in the radial direction.

6. A fluid friction clutch according to claim 1 or 2, further comprising a first baffle member located in the vicinity of said inlet orifice in said reservoir for accelerating the flow of fluid to the working chamber.

7. A fluid friction clutch according to claim 1 or 2, further comprising a second baffle member in the vicinity of said return conduit in said reservoir for delaying the return flow of the fluid from the working chamber.

8. A fluid friction clutch according to claim 7, wherein said second baffle includes a plate member covering at least a portion of said supplemental disk in order to form a trap pocket for the fluid.

9. A fluid friction clutch according to claim 1 or 2, further comprising a second inlet orifice positioned radially outwardly from the periphery of said supplemental disk for passage of the fluid from said reservoir into said working chamber.

10. A fluid friction clutch according to claim 9, further comprising a third baffle member positioned in the vicinity of said second inlet orifice in said reservoir for accelerating the flow of fluid into said working chamber.

11. A fluid friction clutch according to claim 10, wherein said third baffle member includes a plate member covering at least a portion of said supplemental disk, in order to form a trap pocket for the fluid.

* * * * *